United States Patent
Jenkins et al.

(10) Patent No.: US 12,044,278 B2
(45) Date of Patent: Jul. 23, 2024

(54) ANTI-RATTLE CALIPER SLEEVE

(71) Applicant: ZF Active Safety US Inc., Livonia, MI (US)

(72) Inventors: Perry J. Jenkins, Lake Orion, MI (US); Anthony Dixon, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 126 days.

(21) Appl. No.: 17/479,408

(22) Filed: Sep. 20, 2021

(65) Prior Publication Data

US 2023/0089215 A1    Mar. 23, 2023

(51) Int. Cl.
*F16D 65/00* (2006.01)
*F16D 55/00* (2006.01)

(52) U.S. Cl.
CPC ..... *F16D 65/0087* (2013.01); *F16D 65/0006* (2013.01); *F16D 2055/007* (2013.01)

(58) Field of Classification Search
CPC ............. F16D 65/0087; F16D 65/0006; F16D 2055/007
See application file for complete search history.

(56) References Cited

U.S. PATENT DOCUMENTS

| | | | |
|---|---|---|---|
| 4,027,750 A * | 6/1977 | Kawamoto | F16D 55/227 384/16 |
| 4,860,858 A | 8/1989 | Erben et al. | |
| 4,926,979 A * | 5/1990 | Odaka | F16D 55/227 188/73.44 |
| 5,526,904 A | 6/1996 | Walden et al. | |
| 5,785,156 A * | 7/1998 | Warwick | F16D 55/227 188/73.32 |
| 5,810,122 A | 9/1998 | Le Deit et al. | |
| 5,927,446 A * | 7/1999 | Evans | F16D 55/227 188/73.44 |
| 6,135,245 A * | 10/2000 | Kurasako | F16D 65/54 188/73.45 |
| 8,857,576 B2 * | 10/2014 | Kobayashi | F16D 55/2265 188/73.44 |
| 9,394,954 B2 * | 7/2016 | Smith | F16D 65/0087 |
| 10,197,119 B2 * | 2/2019 | Gaye | F16D 55/22655 |
| 10,480,598 B2 * | 11/2019 | Becker | F16D 65/0087 |
| 2004/0188191 A1 * | 9/2004 | Lintner | F16J 3/048 188/73.45 |
| 2012/0234635 A1 * | 9/2012 | Wake | F16D 55/2265 188/73.45 |

(Continued)

*Primary Examiner* — Thomas W Irvin
(74) *Attorney, Agent, or Firm* — Kristin L. Murphy

(57) ABSTRACT

A fastener assembly is provided for helping to secure a mounting bracket to a housing of a vehicle caliper assembly having a piston axially movable for applying braking force to a brake pad. The fastener assembly includes a guide device including guide pin secured to the housing and having a head and a shaft extending into a bore in the mounting bracket. A sleeve includes a first portion configured to extend into the bore and a second portion provided inside the first portion and encircling and engaging the shaft for damping relative movement between the guide pin and the bore in response to vehicle vibrations. A flexible seal encircles the shaft and is connected to the guide pin and the sleeve such that axial movement of the guide pin relative to the bore changes the length of the seal.

17 Claims, 6 Drawing Sheets

(56) References Cited

U.S. PATENT DOCUMENTS

| | | | | |
|---|---|---|---|---|
| 2013/0161134 A1* | 6/2013 | Kobayashi | .......... | F16D 55/2265 |
| | | | | 188/73.44 |
| 2014/0116817 A1* | 5/2014 | Morais | .................. | F16D 55/227 |
| | | | | 188/73.44 |
| 2014/0262637 A1* | 9/2014 | Smith | ................. | F16D 65/0087 |
| | | | | 188/73.44 |
| 2021/0285508 A1* | 9/2021 | Osada | ................... | F16D 55/226 |

* cited by examiner

US 12,044,278 B2

ANTI-RATTLE CALIPER SLEEVE

TECHNICAL FIELD

The present invention relates to braking systems and, in particular, relates to a caliper assembly having anti-rattle countermeasures.

BACKGROUND

Current vehicles are equipped with hydraulic service brakes having housing components that move relative to one another in response to the application and release of the hydraulic pistons applying the braking force. In some instances, the housing components are connected together with fasteners that accommodate the movement. A sealing bellows typically surrounds the fasteners and serves the dual purpose of preventing debris from getting into the housing/fastener interface while damping relative movement between the housing components. It can be desirable, especially for relatively quieter vehicles, to mitigate rattling of the fasteners during braking operations.

SUMMARY

In one example, a fastener assembly is provided for helping to secure a mounting bracket to a housing of a vehicle caliper assembly having a piston axially movable for applying braking force to a brake pad. The fastener assembly includes a guide device including guide pin secured to the housing and having a head and a shaft extending into a bore in the mounting bracket. A sleeve includes a first portion configured to extend into the bore and a second portion provided inside the first portion and encircling and engaging the shaft for damping tilting movement of the guide pin within the bore in response to vehicle vibrations. A flexible seal encircles the shaft and is connected to the guide pin and the sleeve such that axial movement of the guide pin relative to the bore changes the length of the seal.

In another example, a fastener assembly is provided for helping to secure a mounting bracket to a housing of a vehicle caliper assembly having a piston axially movable for applying braking force to a brake pad. The fastener assembly includes a guide device including guide pin secured to the housing and having a head and a shaft extending into a bore in the mounting bracket. A sleeve includes a tubular first portion configured to extend into the bore and a tubular second portion provided inside the first portion for encircling and engaging the shaft for damping tilting movement of the guide pin within the bore in response to vehicle vibrations. The first portion is formed from a first material and the second portion is formed from a second material different from the first material. A flexible seal encircles the shaft and is connected to the guide pin and the sleeve such that axial movement of the guide pin relative to the bore changes the length of the seal.

Other objects and advantages and a fuller understanding of the invention will be had from the following detailed description and the accompanying drawings.

DETAILED DESCRIPTION

Figure 1:
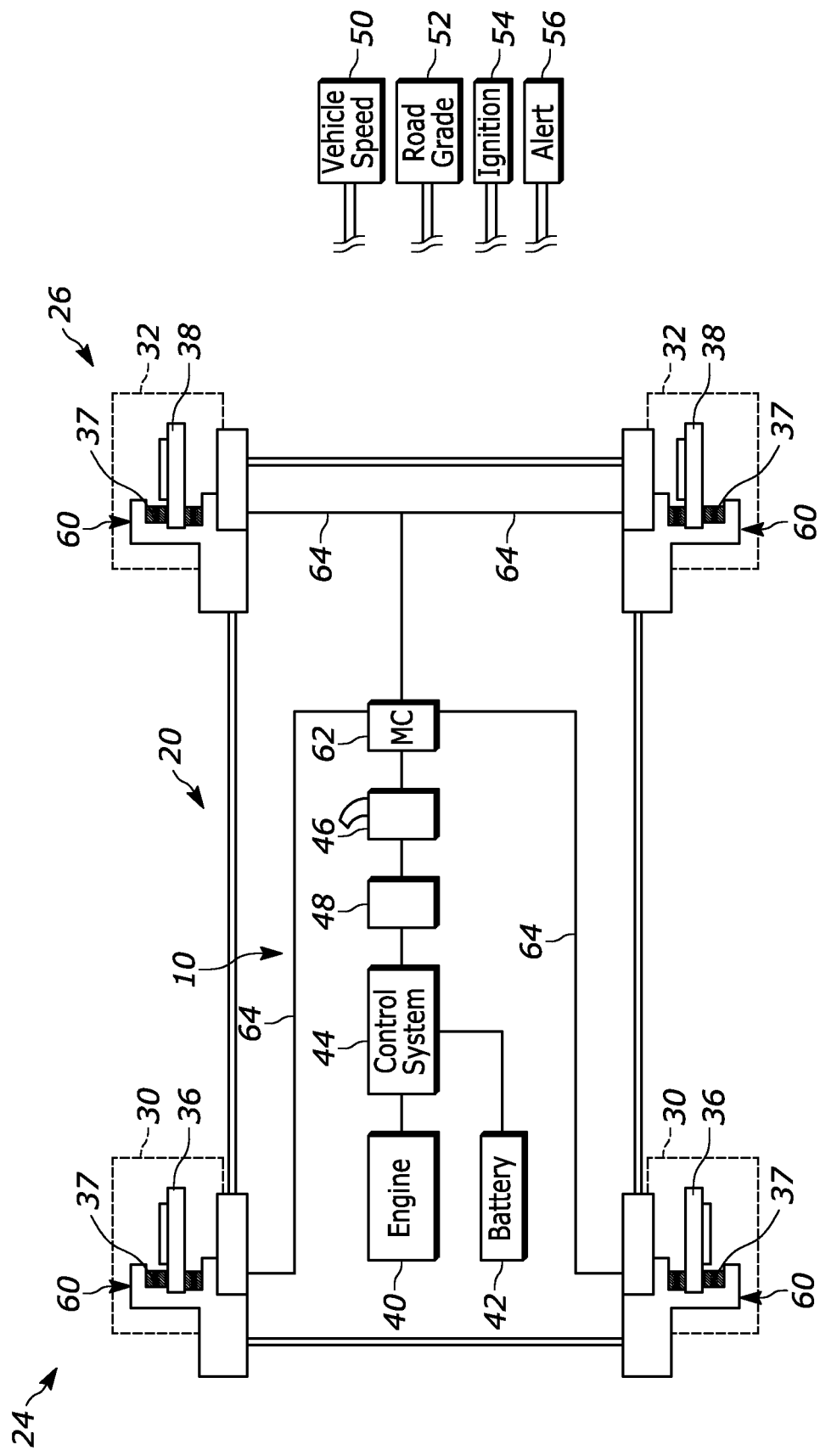
FIG. 1 is a schematic illustration of a vehicle having a braking system including a caliper assembly.

The present invention relates to braking systems and, in particular, relates to a caliper assembly having anti-rattle countermeasures. FIG. 1 illustrates an example braking system 10 for a motor vehicle 20 in accordance with the present invention. The vehicle 20 can be an electric, internal combustion engine, or hybrid vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

A propulsion system 40 including an engine and/or electric motor supplies torque to the wheels rotors 36 and/or the wheels rotors 38. A battery 42 supplies power to the vehicle 20. A brake pedal simulator 46 or brake pedal (not shown) is provided for controlling the timing and degree of vehicle 20 braking. A sensor 48 is connected to the brake pedal simulator 46 and monitors the displacement and acceleration of the brake pedal simulator.

A caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. It will be appreciated, however, that only the front wheel rotors 36 or only the rear wheel rotors 38 can include a caliper assembly 60 (not shown). The caliper assemblies 60 are connected to a master cylinder 62 by hydraulic lines 64. It will be appreciated that the fluid system for the caliper assemblies 60 and master cylinder 62 has been greatly simplified for brevity.

A control system 44 is provided for helping control operation of the vehicle 20, such as operation of the propulsion system 40 and vehicle braking, including operating the caliper assemblies 60. To this end, the control system 44 can include one or more controllers, such as a transmission controller, propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of when the ignition is turned on. The control system 44 can receive and interpret these signals and perform vehicle functions, e.g., braking, in response thereto. The control system 44 can also be connected to an alert 56 for notifying the driver/operator of the vehicle 20 of vehicle conditions, vehicle status, and/or environmental conditions.

Figure 2:
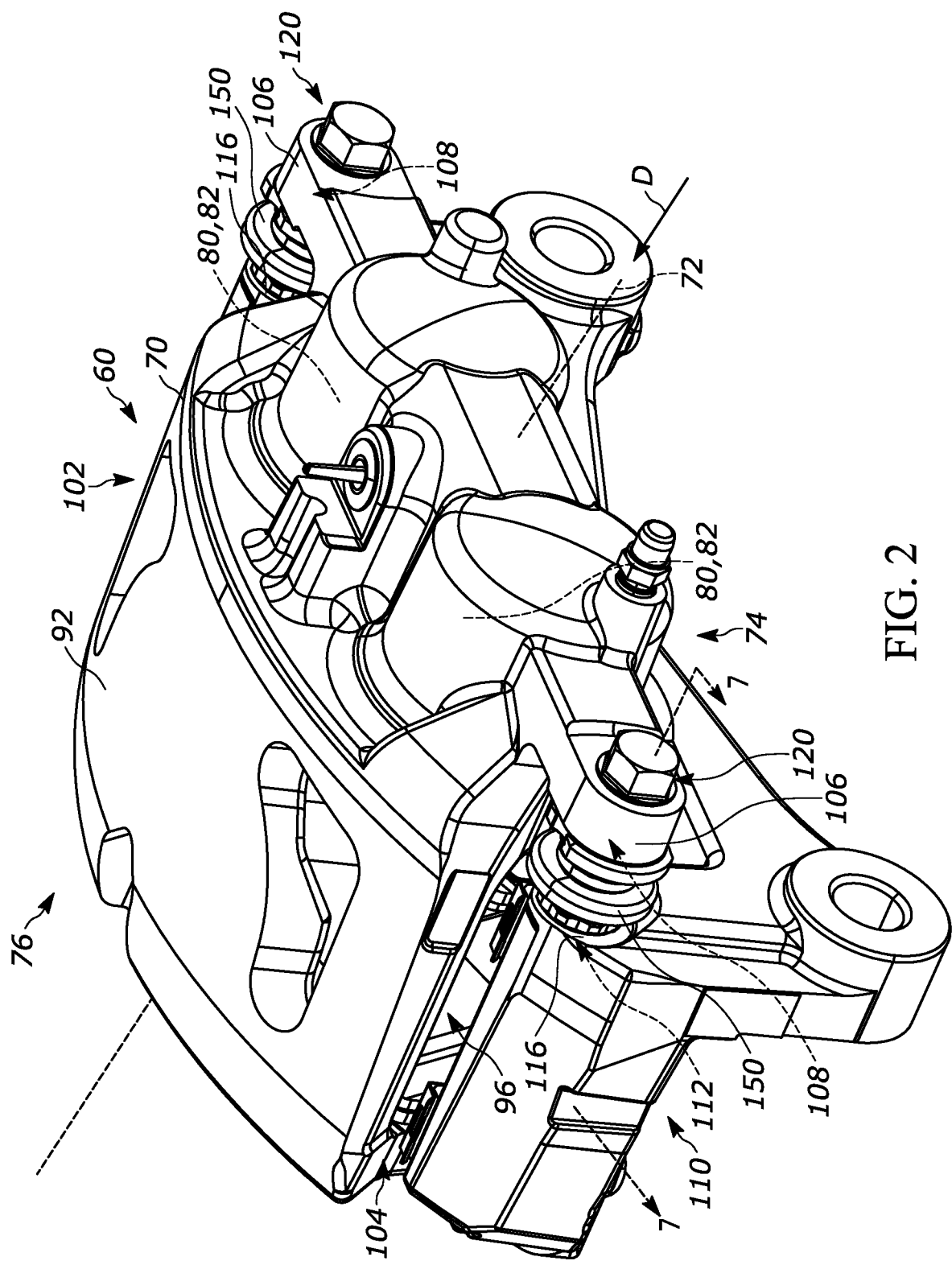
FIG. 2 is a side view of the caliper assembly.
Figure 3:
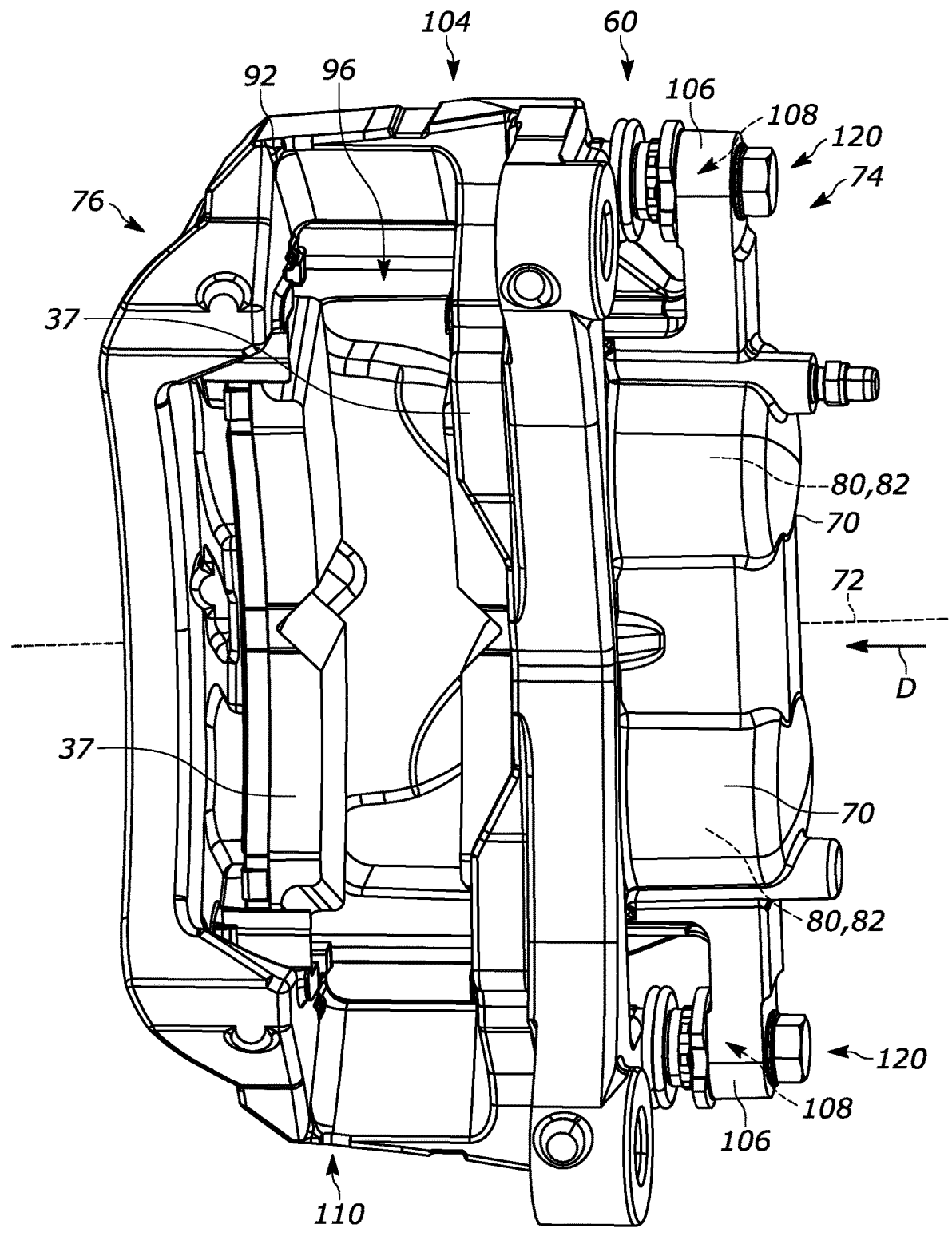
FIG. 3 is a bottom view of the caliper assembly of FIG. 2.

Referring to FIGS. 2-3, the caliper assembly 60 includes a housing 70 extending generally along a centerline 72 from a first end 74 to a second end 76. A pair of bores or passages 80 extend into the housing 70 on opposite sides of the centerline 72. Each passage 80 receives a piston assembly 82 having a piston (not shown) for applying braking forces in a known manner to the brake pads 37 in response to hydraulic pressure. To this end, each passage 80 and piston assembly 82 is fluidly connected to hydraulic lines (not shown) for providing hydraulic fluid thereto.

A bridge 92 extends from the second end 76 of the housing 70 and along/parallel to the centerline 72. The bridge 92 defines a channel 96 for receiving the rotor 36 or 38 (not shown) of one of the wheels 30 or 32. The housing 70 and bridge 92 extend to lateral sides 102, 104 on opposite sides of the centerline 72. An ear or tab 106 is provided on each side 102, 104. A passage 108 extends entirely through each tab 106.

A bracket 110 is connected to the housing 70 for mounting the caliper assembly 60 to the vehicle 20. A bore 112 is provided in the bracket 110 on each side of the centerline 72 and aligned with one of the passages 108 in the housing 70. A fastening assembly 120 extends through each passage 108 and the associated bore 112 for securing the bracket 110 to the housing 70.

Figure 4:
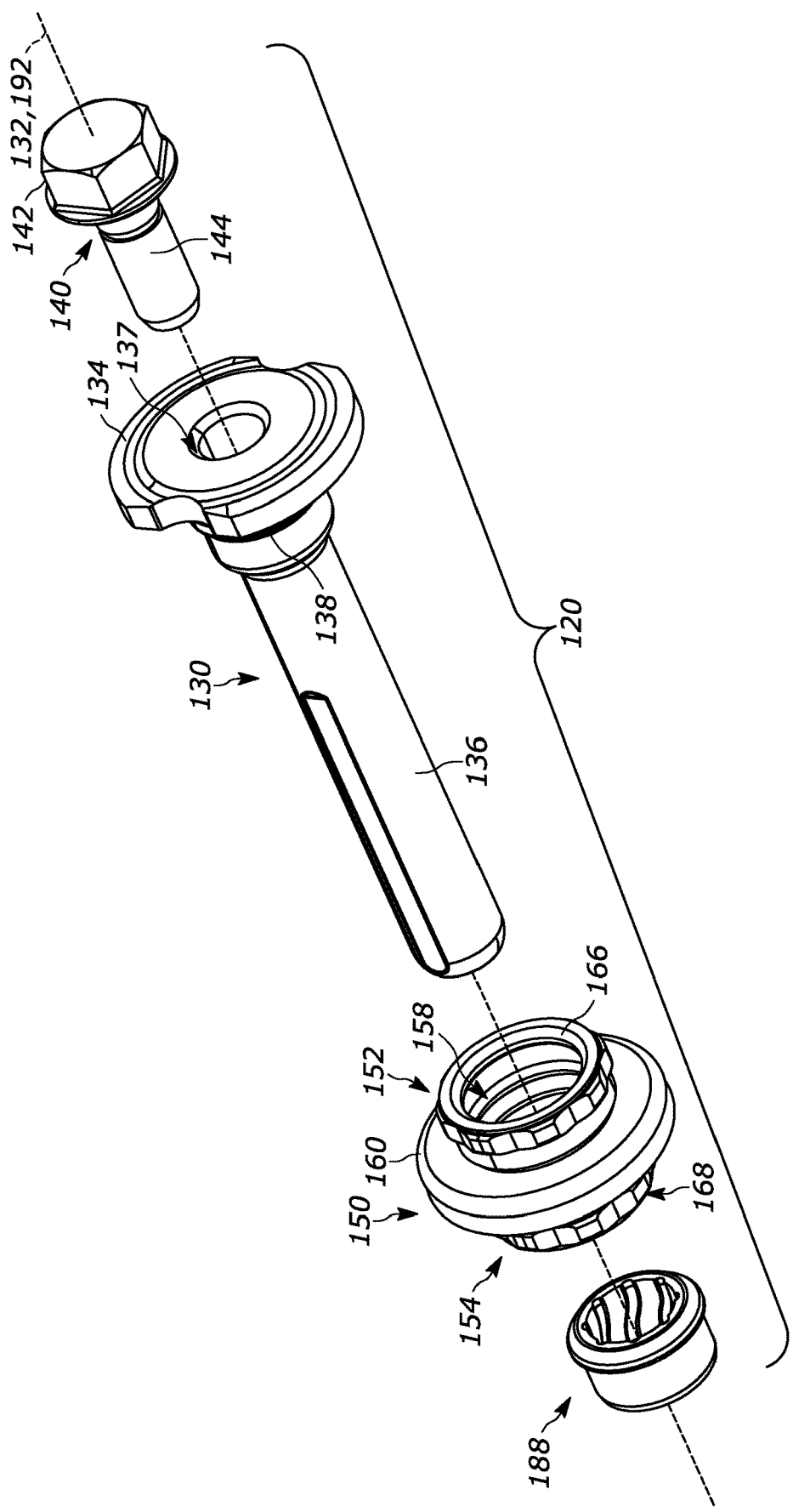
FIG. 4 is an exploded view of an example fastener assembly for the caliper assembly.

Referring to FIG. 4, each fastening assembly 120 includes a guide pin 130, a locking pin 140, a seal 150, and a sleeve 188. It will be appreciated that although the guide pin 130 and locking pin 140 are separate components the locking pin can be considered another component of the guide pin and/or part of a guide device including the guide pin and the locking pin. In any case, the guide pin 130 extends along a centerline 132 and includes a head 134 and a shaft 136 extending longitudinally along the centerline away from the head. A bore or blind hole 137 extends through the head 136 and into the shaft 136. An annular recess 138 is provided at or adjacent to the interface between the head 134 and the shaft 136.

The locking pin 140 includes a head 142 and a shaft 144 extending longitudinally away from the head. The shaft 144 is configured to be received in the bore 137 of the guide pin 130. In one example, the shaft 144 and bore 137 form a threaded connection therebetween. Both the guide pin 130 and the locking pin 140 are formed from a durable material, such as metal.

The seal 150 extends from a first end 152 to a second end 154. A passage 158 extends the entire length of the seal 150. A corrugated portion or bellows 160 is provided between the first and second ends 152, 154 that allows the seal 150 to be compressible/extensible along its length. A locking tab 166 is provided on the first end 152. A similar locking tab 168 is provided on the second end 154. The seal 150 is formed from a flexible/resilient material, such as rubber. One specific rubber example is EPDM.

Figure 5:
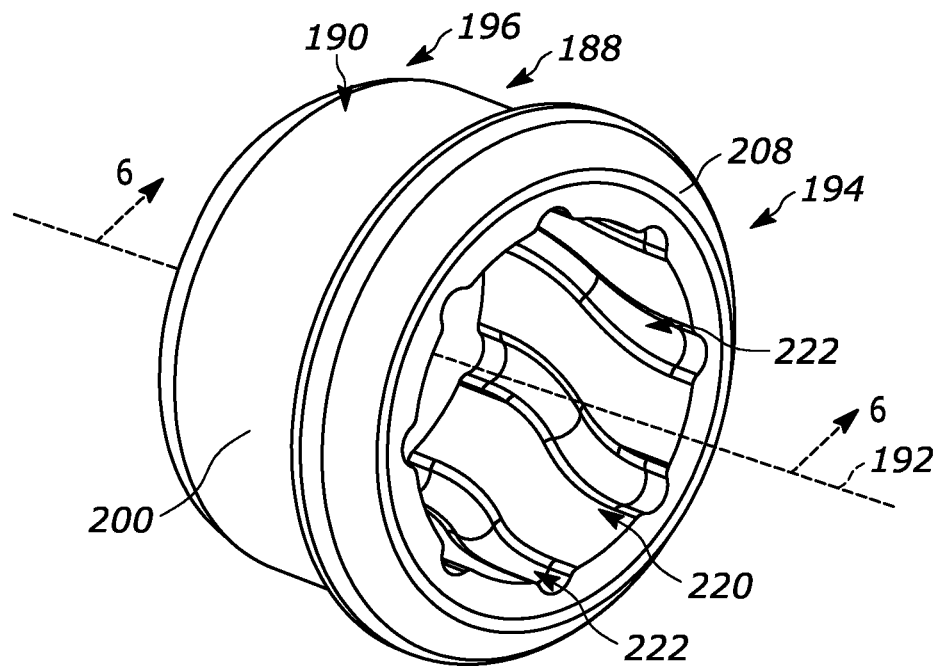
FIG. 5 is a perspective view of a sleeve of the fastener assembly.
Figure 6:
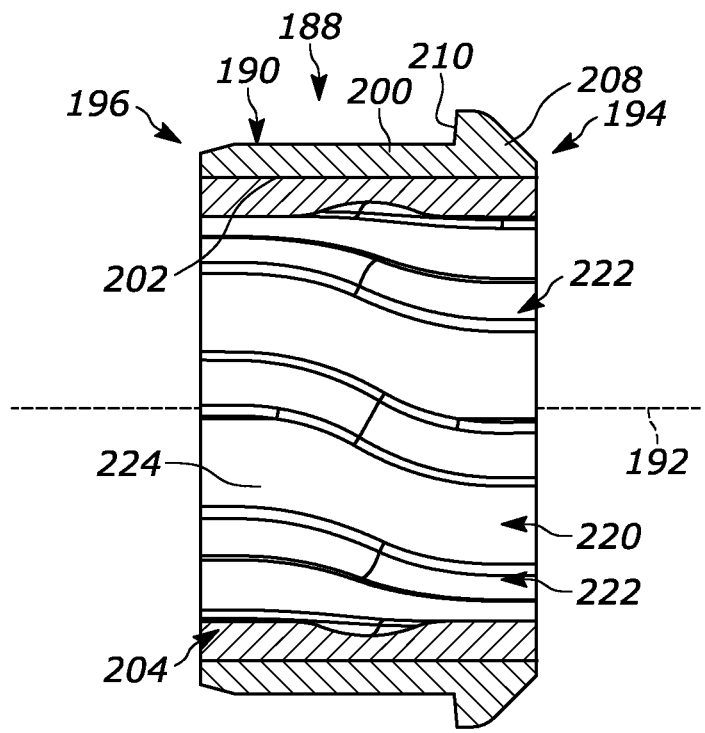
FIG. 6 is a section view of FIG. 5 taken along line 6-6.

Referring to FIGS. 5-6, the sleeve 188 includes a first portion 190 and a second portion 220. The first portion 190 is tubular and extends along a centerline 192 from a first end 194 to a second end 196. The first portion 190 includes a base 200 having an inner surface 202 defining a passage 204 extending the length of the first portion. A tapered or frustoconical flange 208 extends radially outward from the first end 194 of the base 200. The flange 208 defines an end surface 210 that faces the second end 196.

The second portion 220 is tubular and provided within the passage 204 of the first portion 190 abutting the inner surface 202. Consequently, the first portion 190 and second portion 220 are concentric with one another. One or more recesses 222 is formed on an inner surface 224 of the second portion 220. As shown, a series of recesses 222 is symmetrically arranged about the centerline 192. The recesses 222 can be helical (as shown) or straight (not shown).

The first portion 190 is formed from a first material and the second portion 220 formed from a second, different material. For instance, the first material can comprise metal (such as sintered metal) and the second material can comprise rubber. That said, the second portion 220 can be molded directly onto the inner surface 202 of the first portion 190. The second material can have a greater stiffness than the material of the seal 150.

Figure 7:
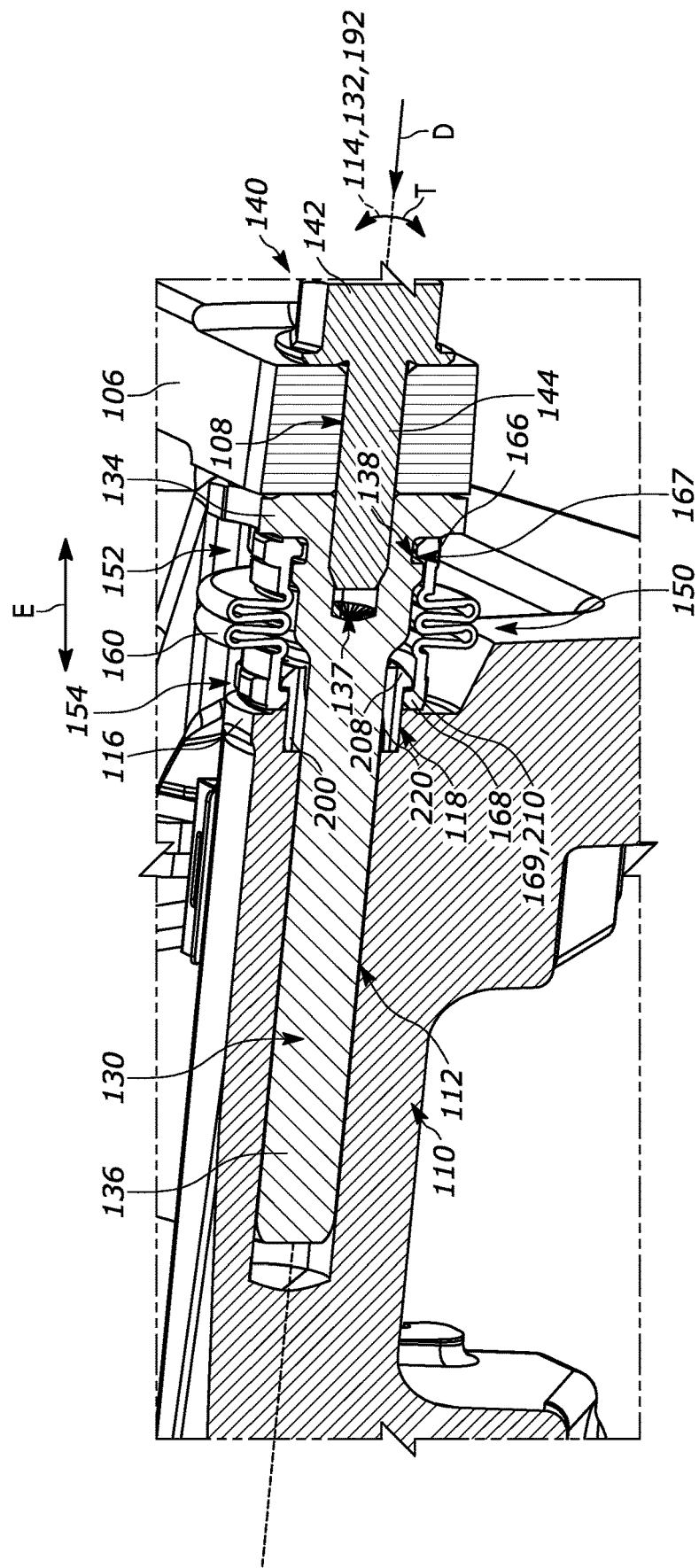
FIG. 7 is a section view of FIG. 2 taken along line 7-7.

As shown in FIG. 7, when the caliper assembly 60 is assembled, the shaft 136 of the guide pin 130 extends into the bore 112 in the bracket 110 such that the head 134 of the guide pin is axially spaced from the projection 116. The shaft 136 and bore 112 are sized to produce a slip fit therebetween. In other words, a radial clearance or space exists between the shaft 136 and inner surface defining the bore 112.

The base 200 of the sleeve 188 is received in a counterbore 118 of the passage 116 in the bracket 110 such that the flange 208 is positioned axially between and spaced from the projection 116 and the head 134 of the guide pin 103. In one example, the base 200 of the sleeve 188 is press-fit into the counterbore 188 to prevent relative movement therebetween. The shaft 136 extends through the second portion 220 of the sleeve 188 and forms a friction fit therewith.

The seal 150 encircles the shaft 136 of the guide pin 130 and the flange 208 of the sleeve 188. The locking tab 166 at the first end 152 is positioned in the annular recess 138 on the guide pin 130 such that an end surface 167 of the locking tab engages/is seated against the surface defining the recess. The locking tab 168 at the second end 154 is positioned between the projection 116 on the bracket 110 and the flange 208 on the sleeve 188. An end surface 169 on the locking tab 168 engages/is seated against the end surface 210 on the flange 208. Consequently, the corrugated portion 140 is positioned axially between and abuts the projection 116 and the head 134 of the guide pin 130.

Both locking tabs 166, 168 can rely on the geometry of the guide pin 130 and sleeve 188 to facilitate installation thereon. In particular, the locking tab 166 can be readily snapped into the recess 138 in the guide pin 130 so as to abut one side of the head 134 (the left as shown). The locking tab 168 can then be urged over the tapered flange 208 on the sleeve 188 until the locking tab snaps over the flange and moves radially inward into engagement with the base 200. In this way, the flange 208 acts as an installation ramp for the locking tab 168.

The tab 106 abuts the opposite side of the head 134 (the right as shown) from the seal 150 such that the passage 108 is aligned with the bore 137. The shaft 144 of the locking pin 140 extends through the passage 108 and is threaded into the bore 137 until the head 142 abuts the tab 106. The tab 106 is therefore pinned between the guide pin 130 and the locking pin 140.

During operation of the braking system 10 (and referring further to FIG. 2), a service brake demand initiated by the system and/or vehicle operator causes hydraulic fluid to be delivered via the hydraulic line to the passage 80 of at least one caliper assembly 60. In this example, service braking is shown for a single, rear end 26 wheel rotor 38.

The hydraulic fluid pressure builds within the passage 80 and behind/upstream of the piston assembly 82 until the fluid pressure is sufficient to urge the piston 102 in the direction D towards and into engagement with the brake pad 37. As a result, the service brake is applied to the wheel rotor 38 and the bridge 92 of the housing 70 elastically deforms in a known manner.

If the demand for service brakes is stopped, hydraulic fluid is no longer supplied to the passage 80 and, thus, the piston is no longer urged in the direction D towards the brake pad 37. This allows the elastically deformed bridge 92, housing 70, and pads 37 to automatically relax and push the piston back towards the passage 80 in the direction opposite the direction D.

With this in mind, the fastener assemblies 120 are configured to accommodate this deformation and relaxation by allowing the housing 70 and bracket 110 to move axially relative to one another along/parallel to the centerline 72. To this end, the fastener assembly 120 fixes the guide pin 130, tab 106, and locking pin 140 together as a single unit. Relaxation of the housing 70, bridge 92, and pads 37 causes the housing to move away from the bracket 110. Since the fastener assembly 120 is fixed to the tab 106, the shaft 136 of the guide pin 130 slides with the housing 70 and within/relative to the bore 112 in the bracket 110 in the direction opposite the direction D. Conversely, applying the brake causes the housing 70 and fastener assembly 120 to move as a single unit in the direction D as the shaft 136 slides within/relative to the bore 112 in the direction D.

During this axial movement, the press-fit sleeve 188 stays fixed in position within the counterbore 118 while the corrugated portion 160 of the seal 150 expands and contracts. More specifically, the first end 152 of the seal 150 moves with the head 134 of the guide pin 130 due to the connection between the locking tab 167 and annular recess 138, while the locking tab 168 stays fixed in position between the projection 116 and flange 208.

In this manner, the seal 150 always covers/encloses the counterbore 118, shaft 136, and sleeve 188 interfaces and thereby helps to prevent dirt, debris, etc. from entering and affecting those interfaces. Furthermore, the recesses 222 in the second portion 220 provide pathways for grease/lubricant to flow during the relative axial movement between the guide pin 130 and bracket 110. That said, the seal 150 also helps to maintain the lubricant within the recesses 222 during brake operations.

Ideally, the centerline 132 of the guide pin 130 remains coincident with the centerline 114 of the bore 112 in the bracket 110 during relative axial movement between the housing 70 and bracket 110. However, due to the aforementioned radial clearance between the bore 112 and shaft 136, the guide pin 130 and, thus, the entire fastener assembly 120 has room to pivot in the manner T relative to the centerline 114 of the bore 112. Such pivoting can be in response to vehicle vibrations and cause audible rattling between the shaft 136 and the bracket 110, which is undesirable.

The sleeve 188 shown and describe is advantageous in that it helps to dampen or alleviate pivoting of the guide pin 130 within the bore 112, which helps to reduce or eliminate audible rattling of the guide pin 130 within bore 112. To this end, the resilient material of the second portion 220 engages the shaft 136 while the first portion 190 is held in the counterbore 118. In particular, the second portion 220 encircles and engages the shaft 136 and is capable of applying a symmetric, radially inward force on the shaft, which helps to maintain the centerlines 114, 132 coextensive and help to minimize/eliminate tilting T of the guide pin 130. Consequently, rattling between the guide pin 130 and bore 112 can be mitigated.

With this in mind, the construction and material of the second portion 220 are specifically selected to dampen tilting motion T of the guide pin 130 relative to the bore 137 while minimally affecting sliding movement of the guide pin relative to the bore. In typical calipers, the bellowed sleeve is responsible for both sealing the fastener/bracket interface as well as damping (during compression) movement of the housing towards the bracket. In this present invention, however, the functions are split and dedicated to different components. More specifically, the seal remains responsible for sealing the guide pin/bracket interface but the sleeve is now responsible for damping tilting movement of the guide pin within the bore in response to vibrations of the moving vehicle. Splitting the functions allows each component to be more specifically configured to accomplish its dedicated purpose. For example, the second portion of the sleeve can be made of stiffer material (to increase the damping effect) than the seal (which only needs to seal and accommodate guide pin movement).

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A fastener assembly for helping to secure a mounting bracket to a housing of a vehicle caliper assembly having a piston axially movable for applying braking force to a brake pad, comprising:
    a guide device including a guide pin secured to the housing and having a head and a shaft extending into a bore in the mounting bracket;
    a sleeve having a first portion configured to extend into the bore and a second portion provided inside the first portion for encircling and engaging the shaft to dampen tilting movement of the guide pin within the bore in response to vehicle vibrations; and
    a flexible seal encircling the shaft and connected to the guide pin and the sleeve such that axial movement of the guide pin relative to the bore changes the length of the seal, wherein the second portion of the sleeve is formed from a material that is stiffer than a material forming the flexible seal.

2. The fastener assembly of claim 1, wherein the sleeve limits tilting movement of the guide pin relative to the bore.

3. The fastener assembly of claim 1, wherein the first and second portions of the sleeve are tubular.

4. The fastener assembly of claim 1, wherein the first portion is formed from a first material and the material of the second portion is different from the first material.

5. The fastener assembly of claim 4, wherein the first material comprises metal and the material of the second portion comprises rubber.

6. The fastener assembly of claim 4, wherein the first material comprises sintered metal and the material of the second portion comprises ethylene propylene diene monomer rubber.

7. The fastener assembly of claim 1, wherein helical recesses are formed in the second portion and extend the entire length of the sleeve.

8. The fastener assembly of claim 1, wherein the guide device includes a locking pin extending through a passage in the housing and being secured to the head of the guide pin.

9. The fastener assembly of claim 1, wherein the first portion includes a base for positioning in the bore and a flange extending radially from the base for connecting to the flexible seal.

10. The fastener assembly of claim 9, wherein the flexible seal extends from a first end to a second end, a locking tab on the first end engaging a recess on the guide pin and a locking tab on the second end engaging the flange on the sleeve.

11. A fastener assembly for helping to secure a mounting bracket to a housing of a vehicle caliper assembly having a piston axially movable for applying braking force to a brake pad, comprising:
- a guide device including a guide pin secured to the housing and having a head and a shaft extending into a bore in the mounting bracket;
- a sleeve having a tubular first portion configured to extend into the bore and a tubular second portion provided inside the first portion for encircling and engaging the shaft to dampen relative movement between the guide pin and the bore in response to vehicle vibrations, the first portion being formed from a first material and the second portion being formed from a second material different from the first material; and
- a flexible seal extending from a first end to a second end and encircling the shaft, the seal being connected to the guide pin and the sleeve such that axial movement of the guide pin relative to the bore changes the length of the seal, wherein the first portion of the sleeve includes a base for positioning in the bore and a flange extending radially from the base for connecting to the flexible seal and wherein a locking tab on the first end of the seal engages a recess on the guide pin and a locking tab on the second end of the seal engages the flange on the sleeve.

12. The fastener assembly of claim 11, wherein the sleeve limits tilting movement of the guide pin relative to the bore.

13. The fastener assembly of claim 11, wherein the first material comprises metal and the second material comprises rubber.

14. The fastener assembly of claim 13, wherein the first material comprises sintered metal and the second material comprises ethylene propylene diene monomer rubber.

15. The fastener assembly of claim 13, wherein the second portion is formed from a material that is stiffer than a material forming the flexible seal.

16. The fastener assembly of claim 11, wherein helical recesses are formed in the second portion and extend the entire length of the sleeve.

17. The fastener assembly of claim 11, wherein the guide device includes a locking pin extending through a passage in the housing and being secured to the head of the guide pin.

* * * * *